US011226415B1

(12) United States Patent
 Song et al.

(10) Patent No.: US 11,226,415 B1
(45) Date of Patent: Jan. 18, 2022

(54) CAMERA MODULES HAVING INTEGRATED TIME OF FLIGHT SENSORS

(71) Applicant: Amazon Technologies, Inc., Seattle, WA (US)

(72) Inventors: Fubin Song, Hong Kong (CN); Jun Ge, Shanghai (CN); Jianhua Du, Guangzhou (CN); Ke Guo, Jincheng (CN); Chaoran Yang, Shenzhen (CN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/020,010

(22) Filed: Sep. 14, 2020

(51) Int. Cl.
 *G01S 17/86* (2020.01)
 *G01S 7/481* (2006.01)
 *H04N 13/254* (2018.01)
 *H04N 5/225* (2006.01)

(52) U.S. Cl.
 CPC ............ *G01S 17/86* (2020.01); *G01S 7/4815* (2013.01); *G01S 7/4816* (2013.01); *H04N 5/2252* (2013.01); *H04N 13/254* (2018.05)

(58) Field of Classification Search
 CPC ...... G01S 17/86; G01S 7/4816; G01S 7/4815; H04N 5/2252; H04N 13/254
 See application file for complete search history.

(56) References Cited

U.S. PATENT DOCUMENTS

| 2019/0339392 | A1* | 11/2019 | Manabe | H04N 5/353 |
|---|---|---|---|---|
| 2020/0194975 | A1* | 6/2020 | Gronenborn | H01S 5/02253 |
| 2020/0235158 | A1* | 7/2020 | Yi | H01L 27/14601 |
| 2020/0256965 | A1* | 8/2020 | Moench | G01S 17/894 |

\* cited by examiner

*Primary Examiner* — Jared Walker
(74) *Attorney, Agent, or Firm* — Eversheds Sutherland (US) LLP

(57) ABSTRACT

Systems, methods, and computer-readable media are disclosed for camera modules having integrated time of flight sensors. In one embodiment, an integrated sensor module may include a substrate, a molding compound disposed on the substrate, and a camera sensor disposed on the substrate. The integrated sensor module may include a vertical-cavity surface-emitting laser assembly (VCSEL) disposed on the molding compound and separated from the substrate by a first distance, and a single photon avalanche photodiode assembly (SPAD) disposed on the molding compound and separated from the substrate by the first distance. The camera sensor may be configured to detect a first portion of light emitted by the VCSEL and reflected from an object, and the SPAD may be configured to detect a second portion of light emitted by the VCSEL and reflected from the object.

20 Claims, 7 Drawing Sheets

CAMERA MODULES HAVING INTEGRATED TIME OF FLIGHT SENSORS

BACKGROUND

Electronic devices may include various sensors. Some sensors, such as depth measurement sensors, cameras, and the like may use light signals to perform various functions. For example, an infrared camera sensor may use an infrared light signal to generate an image. In some instances, devices may include more than one sensor, and each sensor may have its own light source. As a result, the device footprint may be increased, and device durability may be decreased due to the additional number of components that can be damaged during device usage. Accordingly, sensor packages having integrated sensors may be desired.

Figure 1:
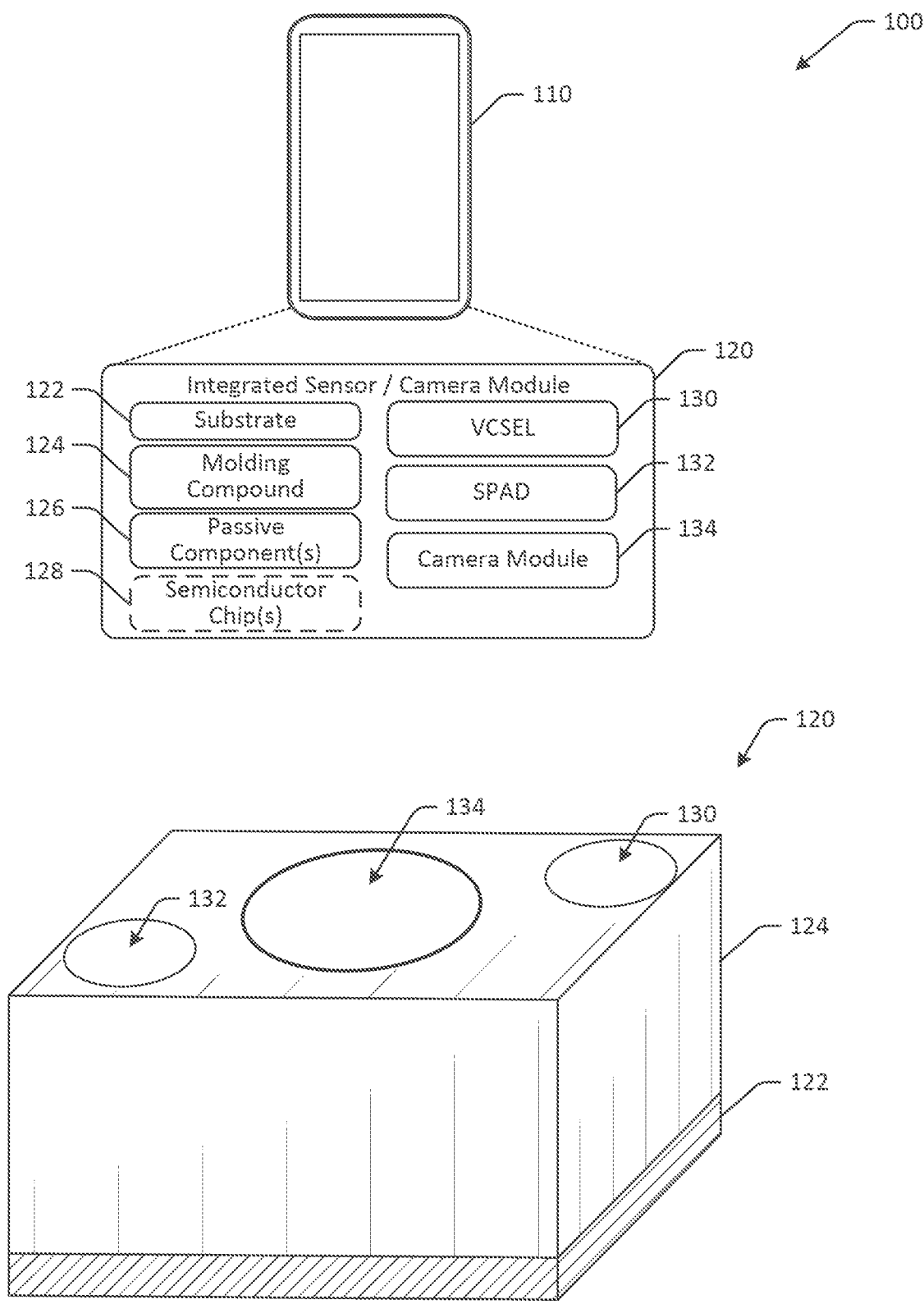
FIG. 1 is a schematic illustration of an example use case of a camera module having an integrated time of flight sensor in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Electronic devices may be used to consume content. Some electronic devices may include various sensors. Certain sensors may use light to perform various operations. For example, depth sensors may use infrared light to determine depth maps or measurements. In other examples, infrared cameras may use light to generate images, time of flight sensors may use infrared light to determine distance values, and so forth. Typically, such sensors may include individual or dedicated light sources that provide light needed for the sensor to operate or perform a specific function. As a result, a footprint of devices that include such sensors may be increased, as space within a housing of the device may be consumed by multiple sensors with individual light sources. Further, in some instances, sensors with dedicated light sources may be positioned adjacent to each other. Such arrangement of sensor or device hardware configuration may not only lead to increased device size and/or footprint, but may also increase costs, reduce device durability (e.g., by increasing the number of components that can be damaged, etc.), increase manufacturing complexity, and may also negatively impact signal transfer speed for individual sensors.

Embodiments of the disclosure include camera modules having integrated sensors, such as integrated time of flight sensors. Certain embodiments include multiple sensors in a single module package that utilize or share the same light source, such that a redundant or dedicated light source is not needed. Embodiments include specific component arrangements that allow for shared usage of a light source without negatively impacting sensor performance. As a result, a footprint or amount of space consumed by individual sensors in a device may be reduced, signal transfer speed may be increased, device durability may be improved, and costs/manufacturing complexity may be reduced.

In one example embodiment, a module may include both an infrared camera sensor and a time of flight sensor. Time of flight sensors may be used in applications ranging from automotive, to robotics, to smartphones, and so forth. Time of flight sensors may be used to determine distances between the sensor and an object by measuring a length of time of an artificial light signal emitted by a light source. In one example, the light source may be a vertical cavity surface emitting laser (VCSEL). The light emitted by the VCSEL may be reflected from an object, and at least a portion of the reflected light may be detected using a single photon avalanche diode (SPAD). The time between the light emission by the VCSEL and the reflected light detection by the SPAD may be used to calculate a distance between the object and the sensor (and/or the device to which the sensor is coupled). VCSELs or other light sources may use invisible light, such as infrared light for various reasons, including low energy draw and reliability. Such systems may also provide high speed modulation, which may be useful in applications such as three-dimensional sensing or distance detection.

Similarly, infrared cameras or night vision cameras may also use infrared light to illuminate images in dark ambient conditions. Infrared light emitting diodes may be used for such infrared camera applications. In some instances, infrared cameras are sensitive to the 850 nanometer to 950 nanometer wavelengths of light, which is also within the range of wavelengths of light output by VCSELs in time of flight sensors.

This disclosure relates to, among other things, systems, methods, computer-readable media, techniques, and methodologies for camera modules having integrated time of flight sensors. Embodiments of the disclosure include camera modules with integrated time of flight sensors in a single package or module. In one example, a three-dimensional infrared camera module is formed to integrate the VCSEL and SPAD chips in cavities of the module housing, so as to reduce module size and footprint. In another example, the VCSEL, SPAD, and infrared camera sensor are disposed on the same substrate to form an all-in-one package. In both examples, the light emitted from the VCSEL can be used by both the SPAD and the camera sensor for their respective functions.

Referring to FIG. 1, an example use case 100 of a device 110 with a camera module having an integrated time of flight sensor 120 is depicted in accordance with one or more embodiments of the disclosure. The device 110 may be any suitable electronic device, such as a smartphone, an e-reader, a tablet, an audio or video streaming device, an Internet of Things device, a product ordering button or device, a home sensor, an aging in place device, an earphone, a speaker device, a robotic arm, an autonomous vehicle, or another device. In the example of FIG. 1, the device 110 may be a smartphone with a display.

The device 110 may include a number of sensors, some of which may need infrared light or other types of light to function. For example, the device 110 may include sensors such as depth sensors, three-dimensional mapping sensors, camera sensors, time of flight sensors, and/or other sensors. The device 110 may include one or more camera modules having an integrated time of flight sensor 120.

The camera module having an integrated time of flight sensor 120 may include a camera sensor and a time of flight sensor that share or utilize a single light source. The camera module having an integrated time of flight sensor 120 may include a number of components, such as chips, including processors and/or memory, passive components, including resistors and/or capacitors, and/or other components that may be mounted on a substrate 122. In the example of FIG. 1, the substrate 122 may be a circuit board or other substrate. The camera module having an integrated time of flight sensor 120 may include additional components, such as a molding compound 124 that at least partially surrounds the components disposed on the substrate 122 and may form a housing of the module, one or more passive components 126, such as resistors and/or capacitors, and one or more optional semiconductor chips 128. The camera module having an integrated time of flight sensor 120 may include one or more VCSELs 130, one or more SPADs 132, and one or more camera sensors or modules 134.

The camera module having an integrated time of flight sensor 120 is depicted in a cube-shaped format in perspective view in FIG. 1. In other embodiments, the camera module having an integrated time of flight sensor 120 may have a different geometry, such as a box-like shape, a rectangular shape, or another geometry. The camera module 134 may be disposed inside a housing of the camera module having an integrated time of flight sensor 120, where the housing is formed by the molding compound 124. The camera module 134 may be disposed at or near a center of the camera module having an integrated time of flight sensor 120, or more specifically, at or near a center of the substrate 122. The SPAD 132 may be disposed at or near a corner of the housing, as illustrated in FIG. 1, and the VCSEL 130 may be disposed at or near an opposite corner of the housing, as depicted in the example of FIG. 1. In other embodiments, the positioning of the respective VCSEL 130, SPAD 132, and camera module 134 may be different.

To reduce an overall size of the camera module having an integrated time of flight sensor 120, the molding compound 124 may include one or more recessed cavities near a top or upper end of the housing. The VCSEL 130 may be positioned at a first recessed cavity, and the SPAD 132 may be positioned at a second recessed cavity. The camera module 134, however, may be disposed on the substrate 122. The passive component 126 may also be disposed on the substrate 122, along with the optional semiconductor chip 128. This arrangement may reduce the amount of space consumed in a device by the camera module having an integrated time of flight sensor 120. The VCSEL 130 and the SPAD 132 may be electrically coupled to the substrate 122 using one or more vias that extend through at least a portion of the molding compound 124.

The molding compound 124 may be disposed on the substrate 122. The molding compound 124 may be any suitable molding compound and may be formed of a material such as a thermosetting material, thermoplastic material, or polymer-based material. Other materials may be used. The molding compound 124 may at least partially surround components disposed on the substrate 122. For example, the molding compound 124 may be disposed about a perimeter of the substrate 122, and may form a cavity around the camera module 134 and/or other components disposed on the substrate 122.

The SPAD 132 and the camera module 134 may use light emitted by the VCSEL 130 to perform their respective functions. Accordingly, the camera module having an integrated time of flight sensor 120 may be an integrated sensor module that includes the substrate 122, the molding compound 124 disposed on the substrate 122, the camera sensor 134 disposed on the substrate 122, a VCSEL assembly 130 disposed on the molding compound 124 and separated from the substrate 122 by a first distance, and a SPAD assembly disposed on the molding compound 124 and separated from the substrate 122 by the first distance.

Example embodiments of the disclosure provide a number of technical features or technical effects. For example, in accordance with example embodiments of the disclosure, certain embodiments of the disclosure may include camera modules with integrated sensors that share a light source, thereby facilitating increased component density and improved performance. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
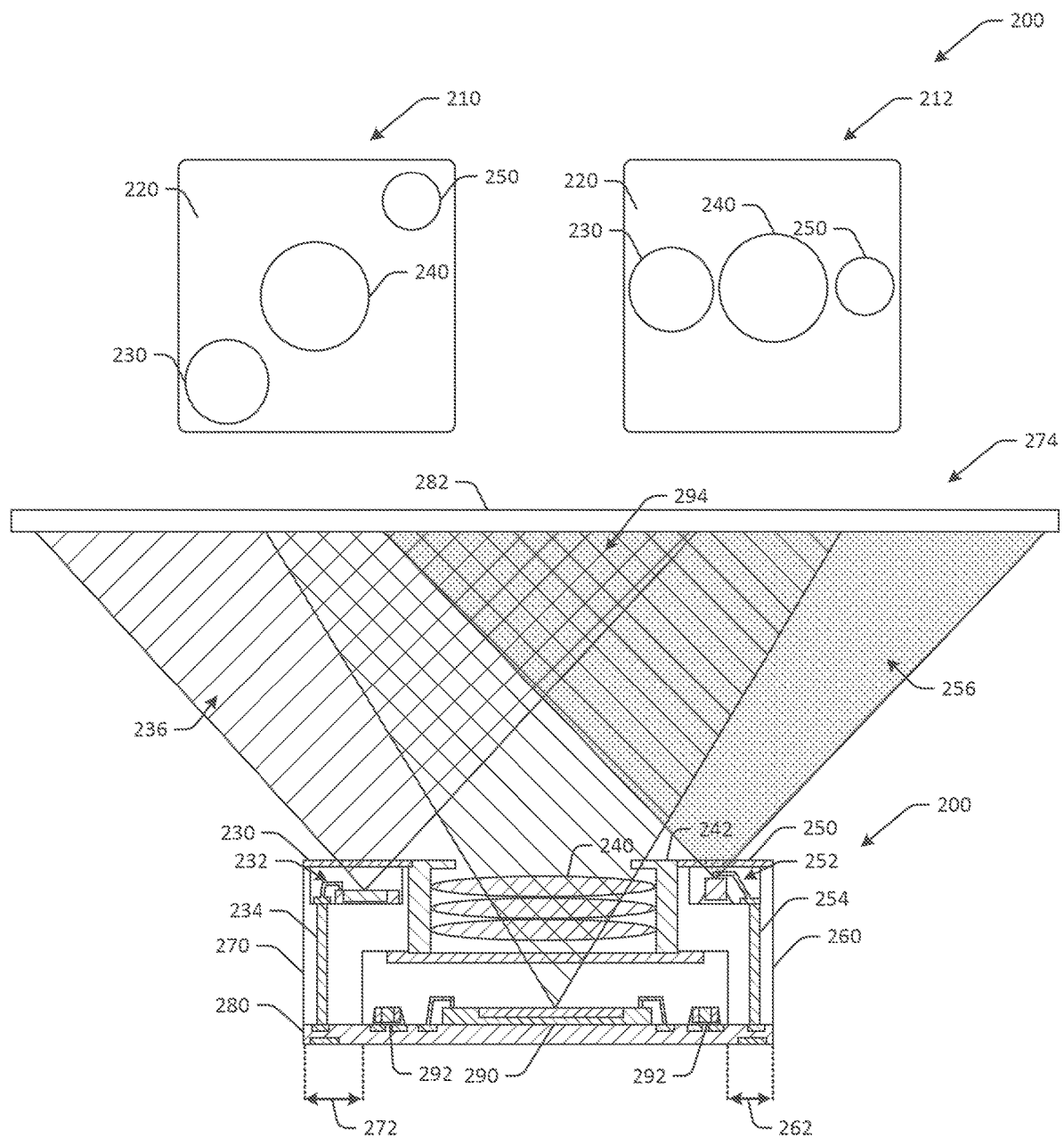
FIG. 2 is a schematic illustration of a camera module having an integrated time of flight sensor in top and cross-sectional views in accordance with one or more embodiments of the disclosure.

FIG. 2 is a schematic illustration of a camera module having an integrated time of flight sensor, or an integrated sensor module 200, in top and cross-sectional views in accordance with one or more embodiments of the disclosure. Other embodiments may include additional or fewer components. Some embodiments may have a different form factor or geometric housing shape.

The integrated sensor module 200 of FIG. 2 may be the same as the camera module having an integrated time of flight sensor 120 of FIG. 1, but may have a different arrangement of components. The integrated sensor module 200 may have a cubic form factor, or may be cube-shaped. In other embodiments, the integrated sensor module 200 may be cylindrical, elongated rectangular (such as that illustrated in FIG. 4), or may have a housing with a different form factor.

The integrated sensor module 200 may be an infrared camera module having an infrared camera chip assembly, and may also include an integrated time of flight sensor. Other embodiments may include different types of sensors. The infrared camera module may include an infrared light source used for functionality of the infrared camera. The time of flight sensor may share the infrared light source used in conjunction with the infrared camera. Accordingly, the time of flight sensor may not need a dedicated infrared light source.

The integrated sensor module 200 may have components arranged in various arrangements. For example, in a first embodiment 210 depicted in top view, the integrated sensor module 200 may have a square cross-sectional geometry. The first embodiment 210 may include a housing 220 formed of a molding compound. The first embodiment 210 may include a SPAD assembly 232 disposed under a SPAD filter 230, a camera sensor 290 disposed under a camera lens 240, and a VCSEL assembly 252 disposed under a VCSEL filter 250. The camera lens 240 may be disposed at or near a center of the integrated sensor module 200 (e.g., at or near a center of the square as illustrated in FIG. 2.). The SPAD filter 230 may be disposed at or near a first corner of the integrated sensor module 200, and the VCSEL filter 250 may be disposed at or near a second corner of the integrated sensor module 200. The second corner may be opposite (e.g., kitty corner, etc.) the first corner.

In a second embodiment 212 depicted in top view, the integrated sensor module 200 may have the same square cross-sectional geometry. The second embodiment 212 may include the housing 220 formed of a molding compound. The second embodiment 212 may include the SPAD assembly 232 disposed under the SPAD filter 230, the camera sensor 290 disposed under the camera lens 240, and the VCSEL assembly 252 disposed under the VCSEL filter 250. The camera lens 240 may be disposed at or near a center of the integrated sensor module 200 (e.g., at or near a center of the square as illustrated in FIG. 2.). However, the SPAD filter 230 may be disposed adjacent to the camera lens 240, instead of at or near a corner. The VCSEL filter 250 may be disposed adjacent to the camera lens 240 as well, but may be at an opposite side of the camera lens 240 relative to the SPAD filter 230. The second embodiment 212 may therefore allow for a different form factor, such as a candy bar form factor or rectangular form factor to be used. Other arrangements may be used based on the functionality of the integrated sensor module 200 and/or its placement in a device.

The integrated sensor module 200 is depicted in use in a cross-sectional view 274. The integrated sensor module 200 may include the molding compound 220 that forms a cube-shaped housing of the integrated sensor module 200. In some embodiments, such as the first embodiment 210, the VCSEL 252 may be disposed at a first upper corner of the cube-shaped housing, the SPAD 232 may be disposed at a second upper corner of the cube-shaped housing, and the camera sensor 290 may be disposed between the VCSEL 252 and the SPAD 232. In other embodiments, such as the second embodiment 212, the molding compound may form a rectangular housing of the integrated sensor module 220, and the VCSEL 252 may be disposed at a first side of the rectangular housing, the SPAD 232 may be disposed at a second side of the rectangular housing, and the camera sensor 290 may be disposed between the VCSEL 252 and the SPAD 232. In both embodiments, the VCSEL 252, the camera sensor 290, and the SPAD 232 may be aligned in a linear arrangement.

The integrated sensor module 200 may include a substrate 280. One or more passive components 292 may be disposed on the substrate 280, and may include resistors, capacitors, and/or other passive components. The molding compound 220 may be disposed on the substrate 280. The molding compound 220 may be any suitable molding compound and may be formed of a material such as a thermoplastic, thermosetting, polymer-based, and/or other type of material. Other materials may be used. The molding compound 220 may at least partially surround or otherwise encompass components disposed on the substrate 280. For example, the molding compound 220 may be disposed about a perimeter of the substrate 280.

The camera sensor 290 may be disposed on the substrate 280. The camera sensor 290 may be an infrared camera sensor and may include an infrared camera image chip and/or other components to form the camera sensor 290. In other embodiments, the VCSEL may be disposed at or near a center of the module instead of the camera sensor.

The molding compound 220 may form one or more recessed cavities (e.g., recessed relative to a top surface of the integrated sensor module 200, etc.) in which the SPAD and VCSEL components are disposed. The recessed cavities may be elevated or otherwise separated from the substrate 280 along a vertical axis. For example, the SPAD 232 may be disposed in a first recessed cavity formed by the molding compound 220. The SPAD 232 may be part of the time of flight sensor and/or may perform at least some of the functionality of the time of flight sensor. For example, the SPAD 232 may detect at least a portion of light emitted by the VCSEL 252 and reflected from an object 282. The VCSEL 252 may be disposed in a second recessed cavity formed by the molding compound 220. The VCSEL 252 may serve as a light source for both the SPAD 232 and the camera sensor 290. The recessed cavities may reduce a footprint of the integrated sensor module 200 by providing space for the respective SPAD 232 and VCSEL 252 components to be disposed without having to be disposed directly on the substrate 280. Accordingly, the VCSEL may be disposed on the molding compound 220 (e.g., in the second recessed cavity) and separated from the substrate 280 by a first vertical distance, and the SPAD 232 may be disposed on the molding compound 220 (e.g., in the first recessed cavity) and separated from the substrate 280 by the first vertical distance. The SPAD 232 and the VCSEL 252 may be separated from the substrate 280 at the same vertical distance as depicted in FIG. 2, whereas in other embodiments, the SPAD 232 and the VCSEL 252 may be separated from the substrate 280 at different vertical distances.

In some embodiments, the integrated sensor module 200 may include a first filter 230 disposed at the upper end adjacent to the SPAD 232, and a second filter 250 disposed at the upper end adjacent to the VCSEL 252. The respective filters may be used to filter light emitted by the VCSEL and/or light detected by the SPAD 232.

The molding compound 220 may have a first sidewall or a first portion 270 disposed at a first side of the substrate 280, and a second sidewall or a second portion 260 disposed at a second side of the substrate 280. The first portion 270 may include the first recessed cavity. The first recessed cavity may be disposed at an upper end of the integrated sensor module 200. Similarly, the second portion 260 may include the second recessed cavity at the upper end. In some embodiments, the VCSEL 252 may be disposed at the first recessed cavity, and the SPAD 232 may be disposed at the second recessed cavity. In other embodiments, the VCSEL 252 may be disposed at the second recessed cavity, and the SPAD 232 may be disposed at the first recessed cavity.

Depending on placement of components on the substrate 280, the first portion 270 and the second portion 260 may have different dimensions. For example, the first portion 270 may have a first width 272 at a lower end adjacent to the substrate 280, and the second portion 260 may have a second width 262 at a lower end adjacent to the substrate 280. The first width 272 and the second width 262 may be the same or may be different. For example, in the illustrated embodiment, the first width 272 may be greater than the second width 262. Such widths may change depending on the space available for the molding compound 220 on the substrate 220, as well as the amount of space needed for a particular component in the respective recessed cavities (e.g., bigger components may be supported by greater widths of molding compound, etc.). The first portion 270 may have a third width at the upper end of the integrated sensor module 290, and the second portion may have a fourth width at the upper end. Regardless of the respective widths at the lower ends of the first portion 270 and the second portion 260, the third width and the fourth width may be the same or different.

The first portion 270 may be disposed along a first side of the substrate 280, which may be a rectangular substrate, and may have a first recessed cavity formed at the second end or upper end of the first portion 270. Similarly, the second portion 260 may be disposed along a second side of the substrate 280, and may have a second recessed cavity formed at the second end or upper end of the second portion 260. Lower ends of the first portion 270 may be separated from the second portion 260, such that a cavity is formed about the camera sensor 290. Upper ends of the first portion 270 and the second portion 260 may be separated, such that the camera sensor 290 is exposed to an ambient environment.

The integrated sensor module 200 may include a lens barrel 242 coupled to the molding compound 220. The lens barrel 242 may support, or otherwise be coupled to, one or more camera lens 240 that are aligned with the camera sensor 290. The camera lens 240 may be disposed between the first portion 270 and the second portion 260.

One or more vias may extend through the respective first portion 270 and the second portion 260 to electrically couple the components in the recessed cavities to the substrate 280. For example, a first via 234 (which may include a conductive material disposed therein) may extend through the first portion 270 from the first recessed cavity to the substrate 280. The first via 234 may electrically couple the SPAD 232 to the substrate 280. Similarly, a second via 254 (which may include a conductive material disposed therein) may extend through the second portion 260 from the second recessed cavity to the substrate 280. The second via 254 may electrically couple the VCSEL 252 to the substrate 280. Accordingly, the VCSEL 252 may be coupled to the substrate 280 by the second via 254 extending through the molding compound 220, and the SPAD 232 may be coupled to the substrate 280 by the first via 234 extending through the molding compound 220.

During operation, the VCSEL 252 may emit infrared light 256 that may be reflected from the object 282. A first portion of the reflected light may be detected by the camera sensor 290, and a second portion of the reflected light may be detected by the SPAD 232. Some of the first portion and the second portion of reflected light may be the same (e.g., the first portion and the second portion of reflected light are not necessarily mutually exclusive, etc.). The camera sensor 290 may have a field of view 294 to detect reflected light, and the SPAD 232 may have a field of view 236 to detect reflected light. In this manner, the SPAD 232 and the camera sensor 290 may share the VCSEL as a light source. As depicted, a sufficient amount of reflected light may be within the respective fields of view of the camera sensor 290 and the SPAD 232. In other embodiments, normal camera sensors may be used with optical proximity sensors with emitters and receivers.

In some embodiments, to increase the amount of reflected light detected by the SPAD 232, the floors of one or both of the first recessed cavity and the second recessed cavity may be angled towards each other. For example, the floor of the first recessed cavity may be angled at a slope of 10 degrees, such that the SPAD 232 is angled towards the VCSEL 252, and/or the floor of the second recessed cavity may be angled at a slope of −10 degrees, or an angle opposite the angle of the first recessed cavity, such that the VCSEL 252 is angled towards the SPAD 232. Accordingly, the first recessed cavity may have a first floor oriented at a first angle with respect to the substrate 280, and the second recessed cavity may have a second floor oriented at a second angle with respect to the substrate 280. A first angle of the floor of the first recessed cavity may be opposite a second angle of the second recessed cavity relative to a vertical axis.

Figure 3A:
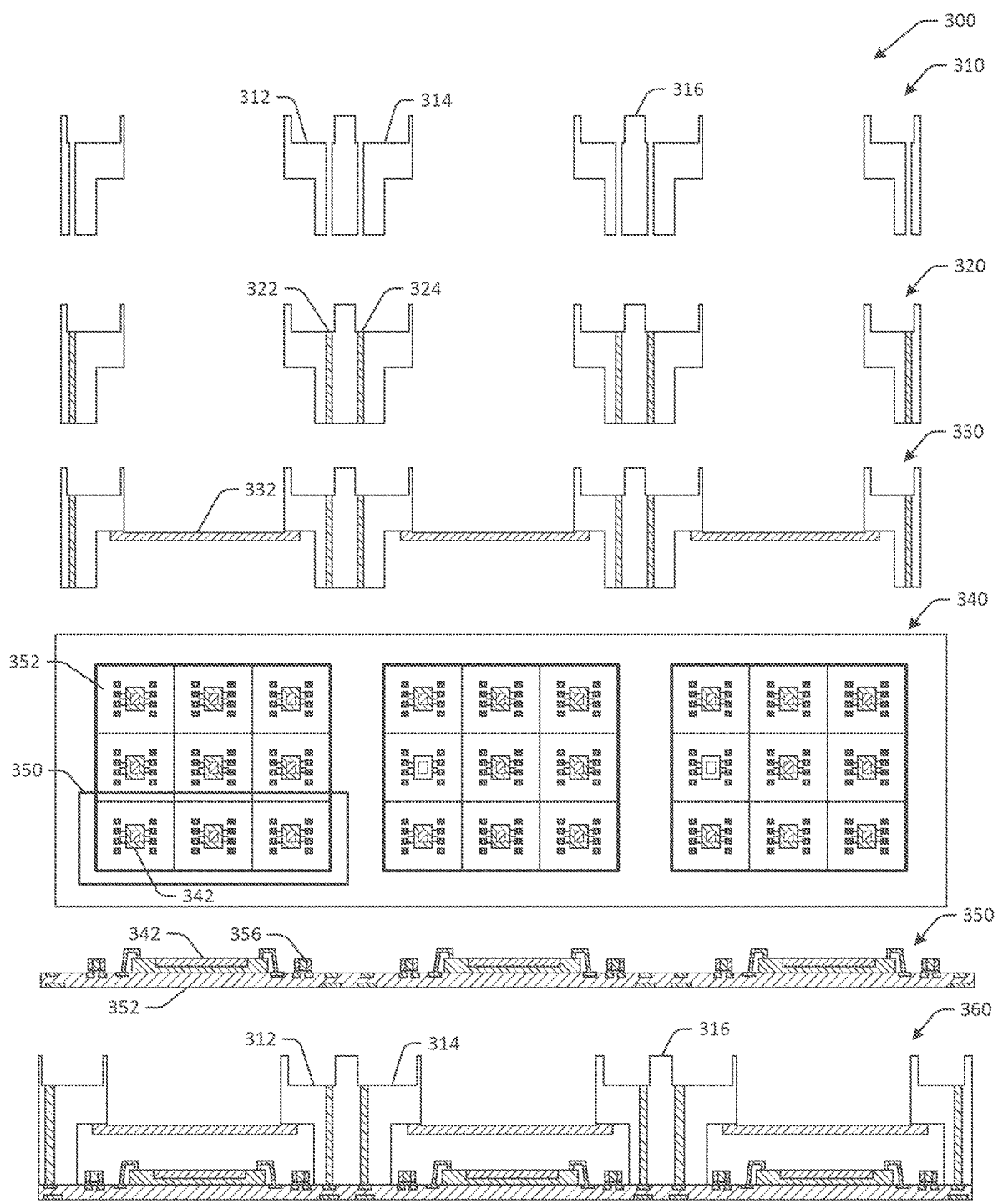
FIGS. 3A-3B are schematic illustrations of an example process of forming the camera module having an integrated time of flight sensor of FIG. 2 in accordance with one or more embodiments of the disclosure.
Figure 3B:
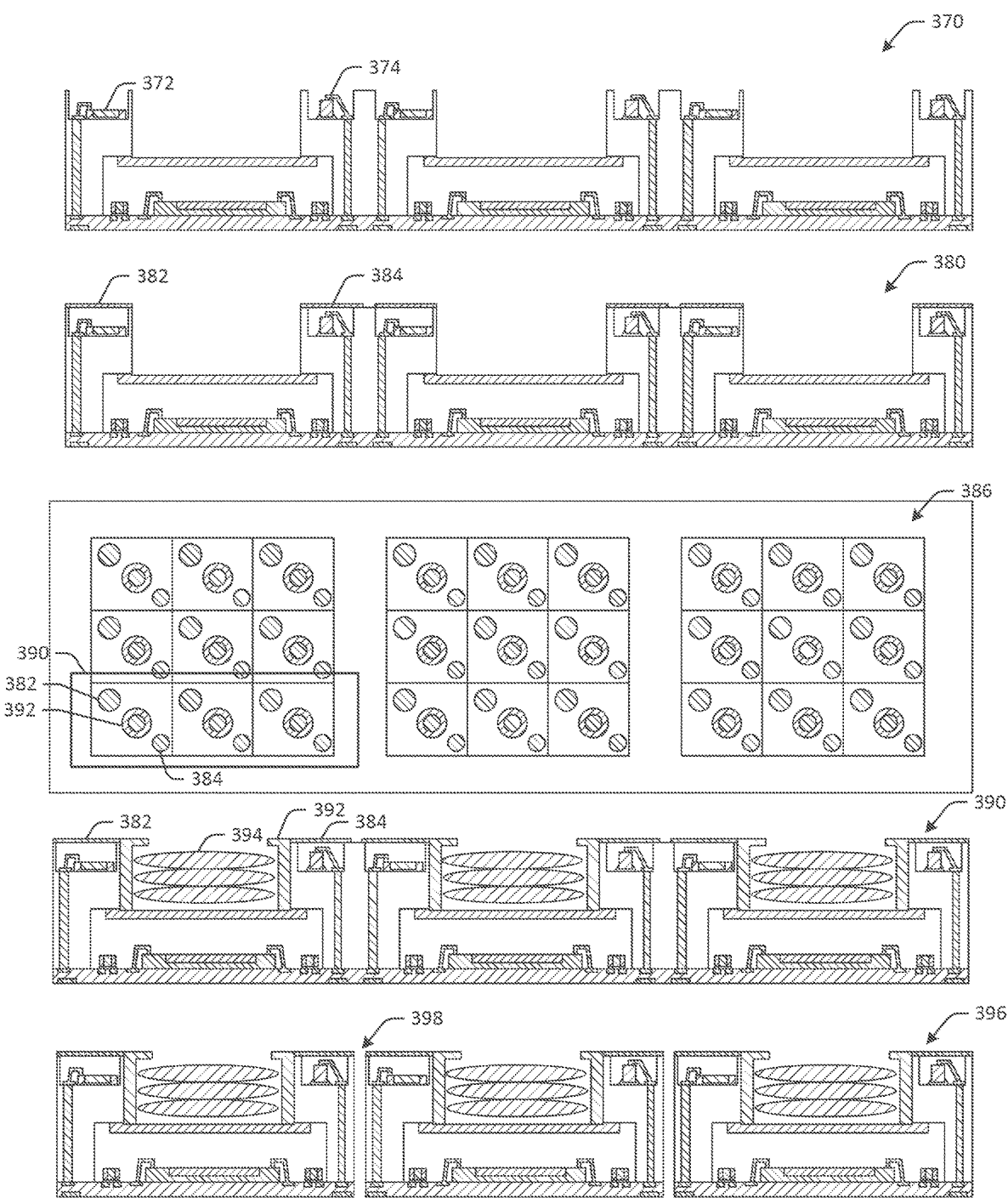

FIGS. 3A-3B are schematic illustrations of an example process 300 of forming the camera module having an integrated time of flight sensor of FIG. 2 in accordance with one or more embodiments of the disclosure. Other embodiments may use a different process than that illustrated in FIGS. 3A-3B. Additional or fewer operations may be included. The process 300 may be used to form the integrated sensor module 200 of FIG. 2 at a strip level, so as to reduce manufacturing time and cost.

At a first operation 310, a housing of an integrated sensor module, such as the integrated sensor module 200 of FIG. 2, is fabricated with recessed cavities for a VCSEL and a SPAD, along with respective vias to couple the VCSEL and the SPAD to a substrate. The housing may include a first recessed cavity 312 for the VCSEL and a second recessed cavity 314 for the SPAD, as well as a camera module housing 316. For example, a selective molding process may be used to form one or more cavities in the molding compound. In one example, molding tooling may include blocks and/or pillars aligned with components adjacent to which cavities are to be formed. The molding compound may be injected into the tooling and may avoid areas where blocks and/or pillars are, so as to form cavities in the molding compound.

At a second operation 320, a respective first via 322 and a second via 324 may be filled with an electrically conductive material. At a third operation 330, filters may be assembled onto the housing. For example, an infrared camera filter 332 may be coupled to the housing.

At a fourth operation 340, camera sensor chips may be coupled to the substrate. For example, a substrate strip is depicted in top view, and individual camera sensor chips 352 with corresponding passive components are depicted. A portion of the camera sensor chips 350 includes a camera sensor chip 342 and is depicted in side view. The substrate strip may include a substrate 352, the camera sensor chip 342 and passive component 356.

At a fifth operation 360, the housing may be assembled with filters on the substrate strip. As depicted, the housing formed of molding compound and with the filters applied from the third operation 330 may be coupled to the substrate strip to form the combined assembly depicted at the fifth operation 360. Glue or a different adhesive may be used to couple the substrate strip and the molding compound.

At a sixth operation 370, a VCSEL 374 and a SPAD 372 may be coupled to the respective first and second recessed cavities formed in the molding compound. For example, the VCSEL 374 may be disposed in the first recessed cavity 312 and the SPAD 372 may be disposed in the second recessed cavity 314. The VCSEL 374 may be electrically coupled to the substrate using the first via, and the SPAD 372 may be electrically coupled to the substrate using the second via.

At a seventh operation 380, the respective filters for the VCSEL and SPAD may be assembled. For example, a VCSEL filter 384 may be coupled to the molding compound adjacent to the VCSEL 374, and a SPAD filter 382 may be coupled to the molding compound adjacent to the SPAD 372.

At an eighth operation 390, a lens barrel may be assembled with a camera lens in the housing. For example, the combined housing and substrate strip 386 is depicted in a top view and includes a portion 390 of the housing with the SPAD filter 382, a lens barrel 392, and the VCSEL filter 384. As shown in side view, the lens barrel 392 may include a camera lens 394.

At a ninth operation 396, a singulation process may be performed to segment the respective integrated sensor modules at location 398. The individual modules may then be processed for focus adjustment, testing, and so forth.

Figure 4:
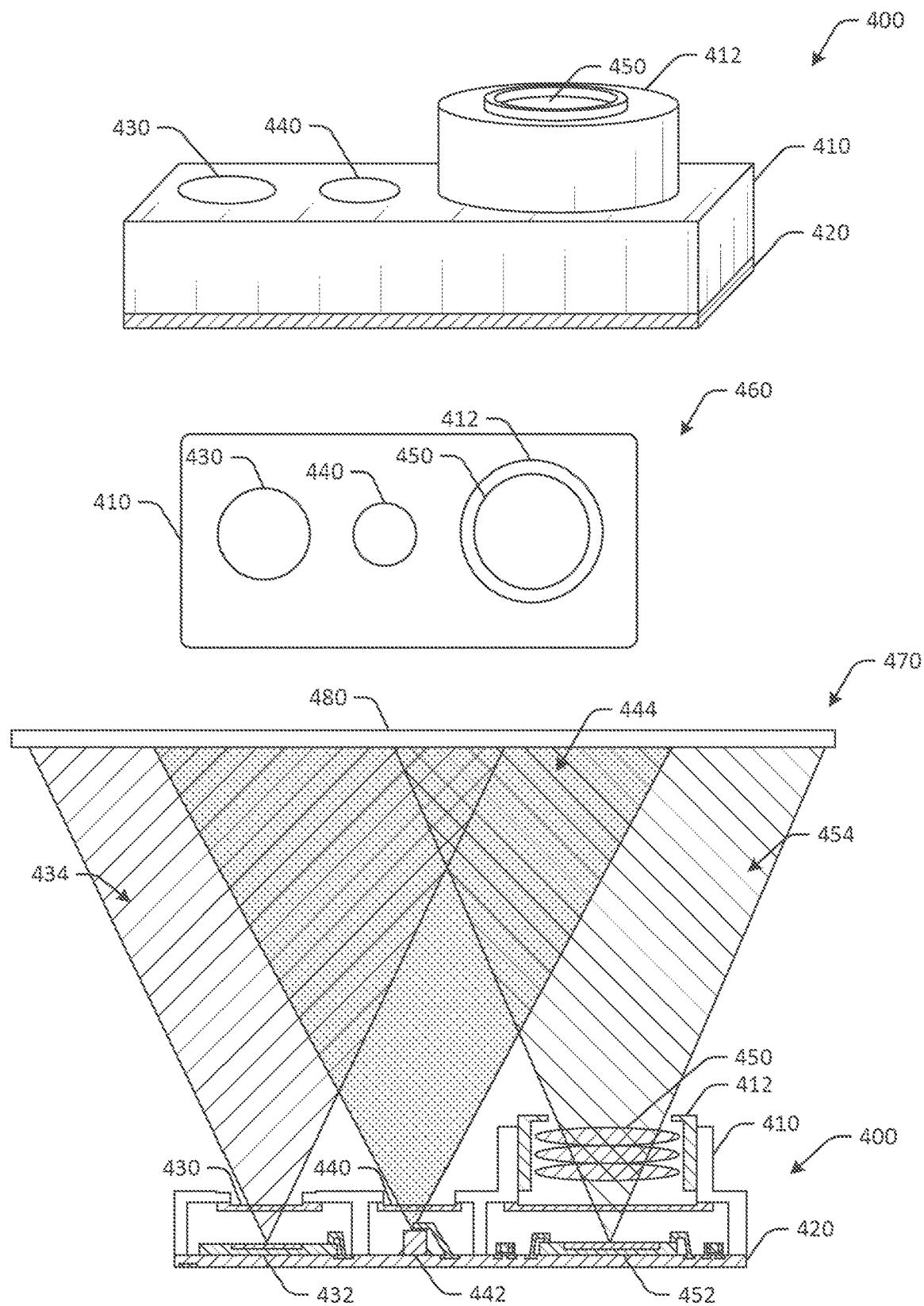
FIG. 4 is a schematic illustration of a camera module having an integrated time of flight sensor in perspective, top, and cross-sectional views in accordance with one or more embodiments of the disclosure.

FIG. 4 is a schematic illustration of a camera module having an integrated time of flight sensor, or an integrated sensor module 400, in perspective, top, and cross-sectional views in accordance with one or more embodiments of the disclosure. Other embodiments may include additional or fewer components. Some embodiments may have a different form factor or geometric housing shape.

The integrated sensor module 400 of FIG. 4 may perform the same functionality as the camera module having an integrated time of flight sensor 120 of FIG. 1, but may have a different arrangement of components. The integrated sensor module 400 may have a rectangular or candy bar form factor.

In the integrated sensor module 400, the VCSEL, SPAD, and camera chips or other related components may all be disposed on the substrate in a single package. The integrated sensor module 400 may therefore not include recessed cavities as described with respect to the embodiment of FIG. 2.

As depicted in FIG. 4, the integrated sensor module 400 may include a SPAD 432, a VCSEL 442, and a camera sensor 452. The SPAD 432, the VCSEL 442, and the camera sensor 452 may be disposed directly on a substrate 420. A SPAD filter 430 may be disposed adjacent to the SPAD 432, a VCSEL filter 440 may be disposed adjacent to the VCSEL 442, and one or more camera lenses 450 may be disposed adjacent to the camera sensor 452. The camera lens 450 may be coupled to a lens barrel 412 that is disposed in a housing 410 of the integrated sensor module 400. The housing 410 may be formed of a molding compound, as discussed with respect to FIG. 2.

As illustrated in a top view 460 of the integrated sensor module 400, the VCSEL 442 may be disposed between the SPAD 432 and the camera sensor 452. The VCSEL 442, SPAD 432, and the camera sensor 452 may be disposed in a linear arrangement. Placement of the VCSEL 442 between the SPAD 432 and the camera sensor 452 may provide increased overlap between light emitted by the VCSEL and reflected from an object, and the respective fields of view of the SPAD 432 and the camera sensor 452.

For example, as illustrated in cross-sectional view 470, the VCSEL 442 may emit light 444. The light 444 may be reflected from an object 480. The SPAD 432 may have a field of view 434 in which at least a portion of reflected light from the object 480 can be detected. Similarly, the camera sensor 452 may have a field of view 454 in which at least a portion of reflected light from the object 480 can be detected.

Accordingly, the integrated sensor module 400 may be a camera module having an integrated time of flight sensor. The integrated sensor module 400 may include the substrate 420, which may be rectangular, along with a VCSEL 442 configured to emit light in a vertical direction, and a SPAD 432 configured to detect a first portion of light emitted by the VCSEL 442 and reflected from the object 470. The integrated sensor module 400 may include an infrared camera chip or camera sensor 452 that is configured to detect a second portion of light emitted by the VCSEL 442 and reflected from the object 480. The integrated sensor module 400 may include a camera lens 450 and a molding compound disposed on the substrate 420, where the molding compound forms the housing 410 of the infrared camera module 400.

Figure 5:
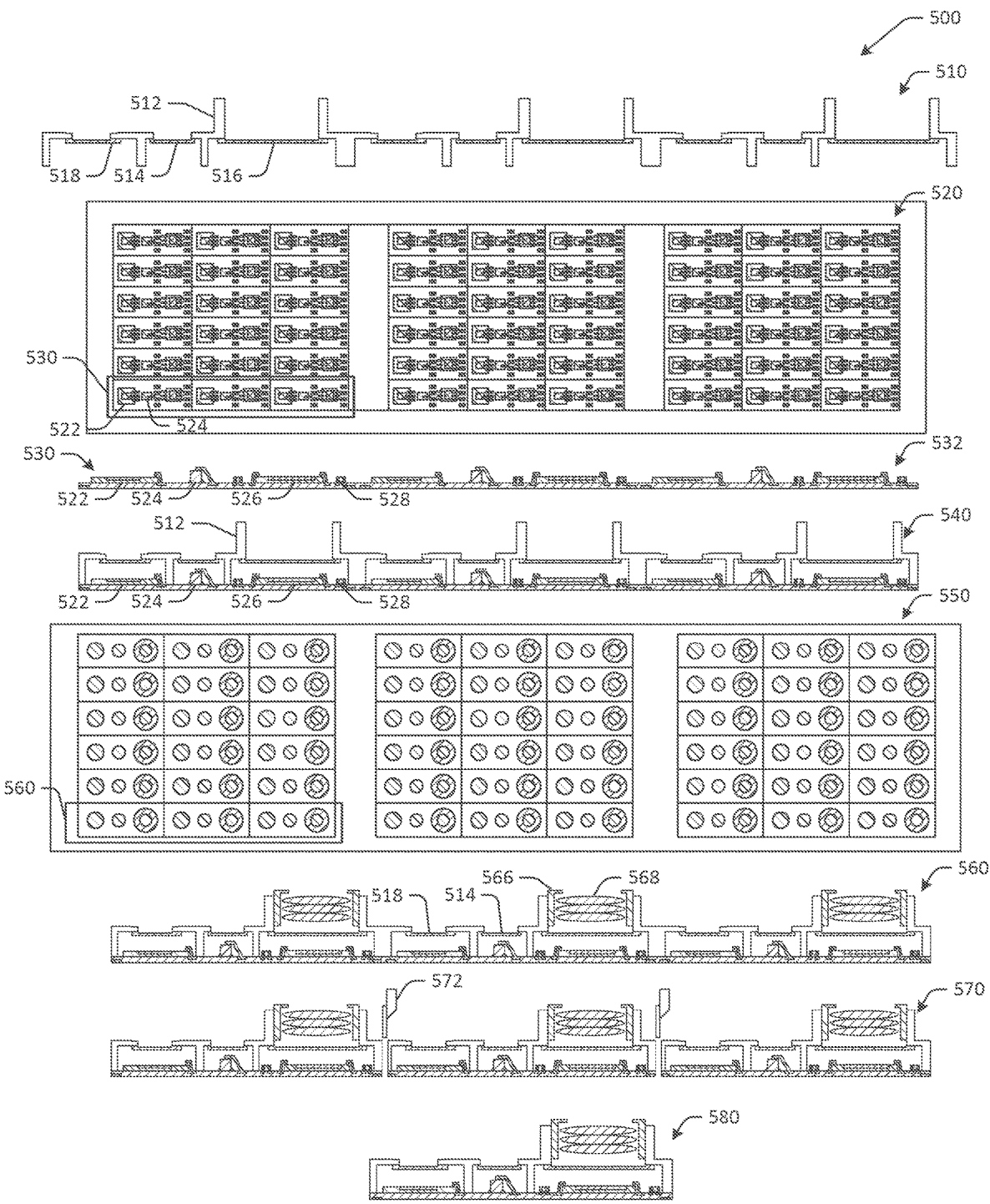
FIG. 5 is a schematic illustration of an example process of forming the camera module having an integrated time of flight sensor of FIG. 4 in accordance with one or more embodiments of the disclosure.

FIG. 5 is a schematic illustration of an example process 500 of forming the camera module having an integrated time of flight sensor of FIG. 4 in accordance with one or more embodiments of the disclosure. Other embodiments may use a different process than that illustrated in FIG. 5. Additional or fewer operations may be included. The process 500 may be used to form the integrated sensor module 400 of FIG. 4 at a strip level, so as to reduce manufacturing time and cost.

At a first operation 510, a housing of an integrated sensor module, such as the integrated sensor module 400 of FIG. 4, is fabricated, and filters are assembled on the housing. For example, the housing may include portion 512, and a VCSEL filter 514, camera filter 516, and/or SPAD filter may be coupled to the housing.

At a second operation 532, the VCSEL, SPAD, and camera sensor may be coupled to a substrate strip 520 (depicted in top view). For example, the substrate strip 520 may include a portion 530 (also depicted in cross-sectional view) to which a SPAD 522, VCSEL 524, and camera sensor 526 are coupled. One or more passive components 528 may also be coupled to the substrate.

At a third operation 540, the housing with the filters may be assembled onto the substrate strip to form a partially completed assembly 550. At a fourth operation 560, a lens barrel 566 and a camera lens 568 may be coupled to the housing. For example, the lens barrel 566 may be coupled to the partially completed housing of the module.

At a fifth operation 570, a singulation process may be performed to segment the respective integrated sensor modules at location 572 to form individual integrated sensor modules 580. The individual modules may then be processed for focus adjustment, testing, and so forth.

One or more operations of the methods, process flows, or use cases of FIGS. 1-5 may have been described above as being performed by a user device, or more specifically, by one or more program module(s), applications, or the like executing on a device. It should be appreciated, however, that any of the operations of the methods, process flows, or use cases of FIGS. 1-5 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, or use cases of FIGS. 1-5 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Example Device Architecture

Figure 6:
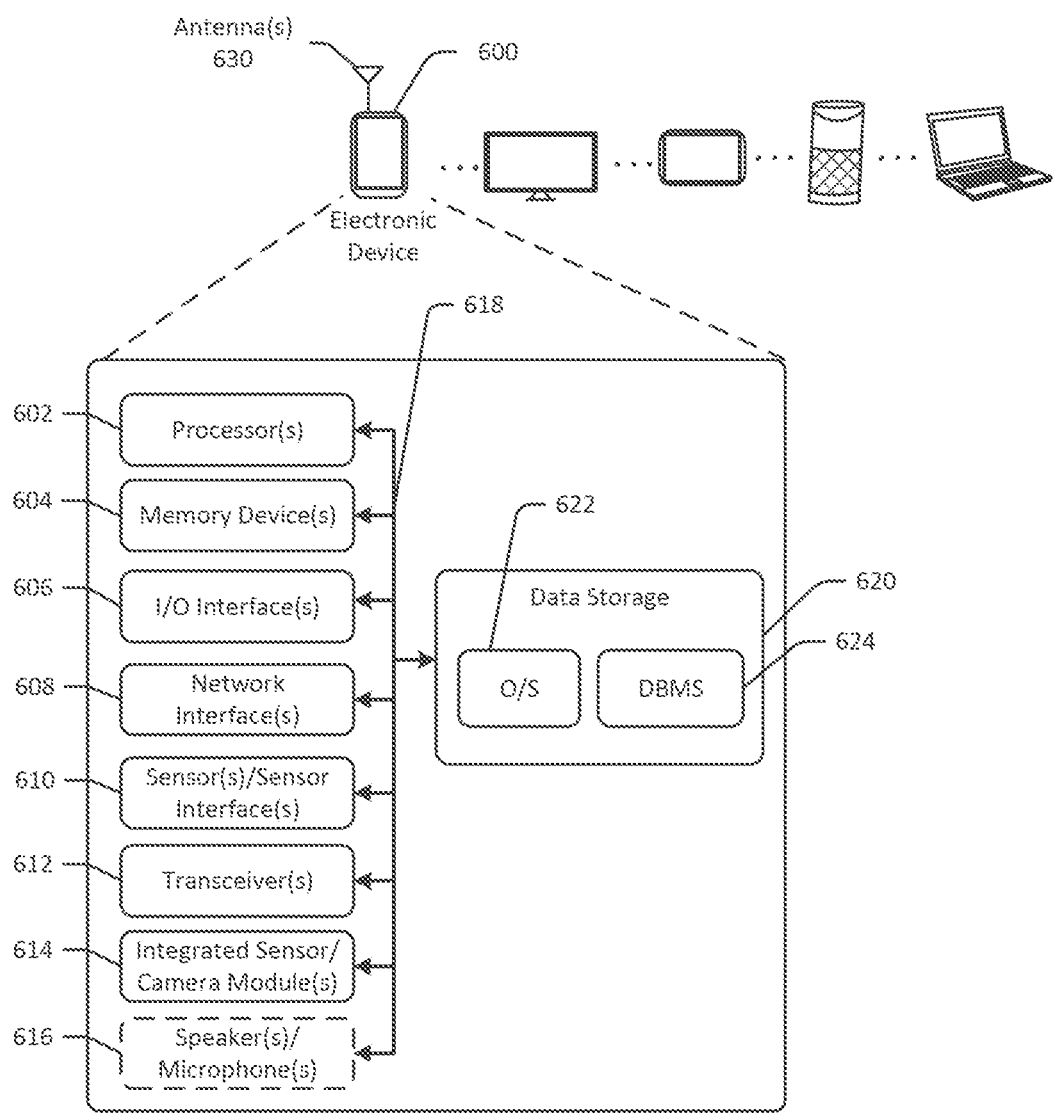
FIG. 6 schematically illustrates an example architecture of an electronic device in accordance with one or more embodiments of the disclosure.

FIG. 6 is a schematic block diagram of one or more illustrative electronic device(s) 600 in accordance with one or more example embodiments of the disclosure. The electronic device(s) 600 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The electronic device(s) 600 may correspond to an illustrative device configuration for the device(s) that includes one or more of the camera module(s) with integrated sensors of FIGS. 1-5.

The electronic device(s) 600 may be configured to communicate with one or more servers, user devices, or the like. The electronic device(s) 600 may be configured to receive one or more batteries, such as a lithium-ion battery. The electronic device(s) 600 may be configured to use a camera module(s) with integrated sensors to determine sensor data, capture audio, capture images, and/or other actions related to light-based operations of the device.

The electronic device(s) 600 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the electronic device(s) 600 may include one or more processors (processor(s)) 602, one or more memory devices 604 (also referred to herein as memory 604), one or more input/output (I/O) interface(s) 606, one or more network interface(s) 608, one or more sensor(s) or sensor interface(s) 610, one or more transceiver(s) 612, one or more integrated sensor/camera module(s) 614, one or more optional microphone(s) 616, and data storage 620. The electronic device(s) 600 may further include one or more bus(es) 618 that functionally couple various components of the electronic device(s) 600. The electronic device(s) 600 may further include one or more antenna(s) 630 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit the exchange of information (e.g., data (including computer-executable code), signaling, etc.) between various components of the electronic device(s) 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 604 of the electronic device(s) 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to the memory 604 for use by the processor(s) 602 during the execution of the computer-executable instructions. Moreover, output data generated as a result of execution of the computer-executable instructions by the processor(s) 602 may be stored initially in the memory 604, and may ultimately be copied to the data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like. Some or all of these module(s) may be sub-module(s). Any of the components depicted as being stored in the data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in the data storage 620 may support functionality described in reference to corresponding components named earlier in this disclosure.

The data storage 620 may further store various types of data utilized by the components of the electronic device(s) 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 602 may be configured to access the memory 604 and execute the computer-executable instructions loaded therein. For example, the processor(s) 602 may be configured to execute the computer-executable instructions of the various program module(s), applications, engines, or the like of the electronic device(s) 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to other illustrative components depicted as being stored in the data storage 620, the O/S 622 may be loaded from the data storage 620 into the memory 604 and may provide an interface between other application software executing on the electronic device(s) 600 and the hardware resources of the electronic device(s) 600. More specifically, the O/S 622 may include a set of computer-executable instructions for managing the hardware resources of the electronic device(s) 600 and for providing common services to other application programs (e.g., managing memory allocation among various application programs). In certain example embodiments, the O/S 622 may control execution of the other program module(s). The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device(s) 600 is a mobile device, the DBMS 624 may be any suitable lightweight DBMS optimized for performance on a mobile device.

Referring now to other illustrative components of the electronic device(s) 600, the input/output (I/O) interface(s) 606 may facilitate the receipt of input information by the electronic device(s) 600 from one or more I/O devices as well as the output of information from the electronic device(s) 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device(s) 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(s) 630 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The electronic device(s) 600 may further include one or more network interface(s) 608 via which the electronic device(s) 600 may communicate with any of a variety of other systems, platforms, networks, devices, and so forth. The network interface(s) 608 may enable communication, for example, with one or more wireless routers, one or more host servers, one or more web servers, and the like via one or more networks.

The antenna(s) 630 may include any suitable type of antenna depending, for example, on the communications protocols used to transmit or receive signals via the antenna(s) 630. Non-limiting examples of suitable antennas may include directional antennas, non-directional antennas, dipole antennas, folded dipole antennas, patch antennas, multiple-input multiple-output (MIMO) antennas, or the like. The antenna(s) 630 may be communicatively coupled to one or more transceivers 612 or radio components to which or from which signals may be transmitted or received.

As previously described, the antenna(s) 630 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 630 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 630 may be configured to transmit or receive radio frequency signals within any suitable frequency range forming part of the unlicensed portion of the radio spectrum.

The antenna(s) 630 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(s) 630—transmitting or receiving radio frequency (RF) signals in the bandwidth and/or channels corresponding to the communications protocols utilized by the electronic device(s) 600 to communicate with other devices. The transceiver(s) 612 may include hardware, software, and/or firmware for modulating, transmitting, or receiving—potentially in cooperation with any of antenna(s) 630—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the electronic device(s) 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The integrated sensor/camera module(s) 614 may be any of the integrated sensor/camera module(s) described herein, and may include sensor(s) configured to determine various data using light, such as infrared light, including generating images, determining distance values or measurements, and/or other functions. The integrated sensor/camera module(s) 614 may be coupled to a battery or other components, such as those described in conjunction with FIGS. 1-5. The optional speaker(s)/microphone(s) 616 may be any device configured to receive analog sound input or voice data.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device(s) 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the electronic device(s) 600 may include alternate and/or additional hardware, software, or firmware components beyond those described or depicted without departing from the scope of the disclosure. More particularly, it should be appreciated that software, firmware, or hardware components depicted as forming part of the electronic device(s) 600 are merely illustrative and that some components may not be present or additional components may be provided in various embodiments. While various illustrative program module(s) have been depicted and described as software module(s) stored in the data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-5 may be performed by a device having the illustrative configuration depicted in FIG. 6, or more specifically, by one or more engines, program module(s), applications, or the like executable on such a device. It should be appreciated, however, that such operations may be implemented in connection with numerous other device configurations.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A camera module having an integrated time of flight sensor, the camera module comprising:
   a rectangular substrate comprising at least one passive component;
   a vertical-cavity surface-emitting laser assembly (VCSEL) configured to emit light in a vertical direction;
   a single photon avalanche photodiode assembly (SPAD) configured to detect a first portion of light emitted by the VCSEL and reflected from an object;
   an camera chip disposed at or near a center of the rectangular substrate and configured to detect a second portion of light emitted by the VCSEL and reflected from the object;
   a camera lens; and
   a molding compound disposed on the substrate, wherein the molding compound forms a housing of the camera module, the molding compound comprising:
      a first portion disposed along a first side of the rectangular substrate, the first portion comprising a first recessed cavity; and
      a second portion disposed along a second side of the rectangular substrate, the second portion comprising a second recessed cavity.

2. The camera module of claim 1, wherein the SPAD is disposed in the first recessed cavity, and wherein the VCSEL is disposed in the second recessed cavity, such that the SPAD and the VCSEL are separated from the rectangular substrate, the camera module further comprising:
   a first via disposed in the first portion and configured to electrically couple the SPAD to the rectangular substrate; and
   a second via disposed in the second portion and configured to electrically couple the VCSEL to the rectangular substrate.

3. The camera module of claim 1, wherein the first recessed cavity has a first floor that is angled at a first angle with respect to the rectangular substrate, and wherein the second recessed cavity has a second floor that is angled at a second angle with respect to the rectangular substrate, wherein the first angle is opposite the second angle relative to a vertical axis.

4. The camera module of claim 1, wherein the VCSEL is disposed at a first corner of the housing, and the SPAD is disposed at a second corner of the housing.

5. An integrated sensor module comprising:
   a substrate;
   a molding compound disposed on the substrate;
   a camera sensor disposed on the substrate;
   a vertical-cavity surface-emitting laser assembly (VCSEL) disposed on the molding compound and separated from the substrate by a first distance; and
   a single photon avalanche photodiode assembly (SPAD) disposed on the molding compound and separated from the substrate by the first distance.

6. The integrated sensor module of claim 5, wherein the substrate is disposed at a lower end of the integrated sensor module, and wherein the molding compound comprises:
   a first portion disposed at a first side of the substrate, the first portion comprising a first recessed cavity adjacent to an upper end of the integrated sensor module; and
   a second portion disposed at a second side of the substrate, the second portion comprising a second recessed cavity adjacent to the upper end.

7. The integrated sensor module of claim 6, wherein the VCSEL is disposed in the first recessed cavity, and the SPAD is disposed in the second recessed cavity.

8. The integrated sensor module of claim 6, wherein the first recessed cavity comprises a first floor oriented at a first angle with respect to the substrate, and the second recessed cavity comprises a second floor oriented at a second angle with respect to the substrate.

9. The integrated sensor module of claim 5, further comprising:
   a camera lens aligned with the camera sensor.

10. The integrated sensor module of claim 5, wherein the molding compound forms a first sidewall having a first width and a second width, and a second sidewall having a third width and a fourth width.

11. The integrated sensor module of claim 10, wherein the first width is different than the third width, and the second width is different than the fourth width.

12. The integrated sensor module of claim 5, wherein the VCSEL is coupled to the substrate by a first via extending through the molding compound, and wherein the SPAD is coupled to the substrate by a second via extending through the molding compound.

13. The integrated sensor module of claim 5, further comprising:
   a first filter disposed at the upper end adjacent to the VCSEL; and
   a second filter disposed at the upper end adjacent to the SPAD.

14. The integrated sensor module of claim 5, wherein the molding compound forms a cube-shaped housing of the integrated sensor module, and wherein the VCSEL is disposed at a first upper corner of the cube-shaped housing, the SPAD is disposed at a second upper corner of the cube-shaped housing, and the camera sensor is disposed between the VCSEL and the SPAD.

15. The integrated sensor module of claim 5, wherein the molding compound forms a rectangular housing of the integrated sensor module, wherein the VCSEL is disposed at a first side of the rectangular housing, and the SPAD is disposed at a second side of the rectangular housing, and wherein the VCSEL, the camera sensor, and the SPAD are aligned in a linear arrangement.

16. A device comprising:
   an integrated sensor module comprising:
      a substrate;
      a molding compound disposed on the substrate;
      a camera sensor disposed on the substrate;
      a vertical-cavity surface-emitting laser assembly (VCSEL) disposed on the molding compound and separated from the substrate by a first distance; and
      a single photon avalanche photodiode assembly (SPAD) disposed on the molding compound and separated from the substrate by the first distance;
   wherein the camera sensor is configured to detect a first portion of light emitted by the VCSEL and reflected from an object, and the SPAD is configured to detect a second portion of light emitted by the VCSEL and reflected from the object.

17. The device of claim 16, wherein the molding compound of the integrated sensor module forms a cube-shaped housing of the integrated sensor module, and wherein the VCSEL is disposed at a first corner of the cube-shaped housing, the SPAD is disposed at a second corner of the cube-shaped housing, and the camera sensor is disposed between the VCSEL and the SPAD.

18. The device of claim 16, wherein the molding compound of the integrated sensor module comprises:
   a first sidewall disposed at a first side of the substrate, the first sidewall comprising a first recessed cavity; and
   a second sidewall disposed at a second side of the substrate, the second sidewall comprising a second recessed cavity.

19. The device of claim 18, wherein the VCSEL is disposed in the first recessed cavity, and the SPAD is disposed in the second recessed cavity.

20. The device of claim 18, wherein the first recessed cavity comprises a first floor oriented at a first angle with respect to the substrate, and the second recessed cavity comprises a second floor oriented at a second angle with respect to the substrate.

* * * * *